United States Patent [19]

Rounds

[11] Patent Number: 4,535,030

[45] Date of Patent: Aug. 13, 1985

[54] COATED SUBSTRATE

[76] Inventor: Nicholas A. Rounds, 271 Tamenend Ave., New Britain, Pa. 18901

[21] Appl. No.: 599,835

[22] Filed: Apr. 13, 1984

Related U.S. Application Data

[63] Continuation-in-part of Ser. No. 551,445, Nov. 14, 1983.

[51] Int. Cl.³ .................. B32B 27/08; B32B 27/36; G01D 15/34
[52] U.S. Cl. .................. 428/413; 346/135.1; 346/137; 428/430; 428/447; 428/450; 428/463; 428/480; 428/913
[58] Field of Search .............. 560/185; 346/135.1, 346/137; 428/913

[56] References Cited

U.S. PATENT DOCUMENTS 4,187,383  2/1980  Cowherd, III et al. ........ 560/185 X Primary Examiner—Thomas J. Herbert

[57]     ABSTRACT

A polymer coated information storage device, such as a disc, is disclosed. A coating composition for preparing such polymeric coating comprises certain esters of beta-acryloxypropionic acid with certain diacrylates. The coating composition also comprises under certain circumstances, a photoinitiator.

18 Claims, No Drawings

COATED SUBSTRATE

BACKGROUND OF THE INVENTION

This application is a continuation-in-part of my co-pending application Ser. No. 551,445, filed Nov. 14, 1983.

This invention relates to a polymer coated information storage device, such as a disc. More specifically, this invention relates to a polymer coated information storage device wherein the polymer coating has enhanced properties.

Information storage devices, such as a disc, may be prepared by using, for example, a laser to mark the surface of the disc with a retrievable information code. When the information is to be read from the storage device, such reading is generally done by a laser. The laser uses converging light to read the pits of the storage device. It therefore becomes important that the laser be focused properly so that the light will converge on the surface of the disc. If the laser is not focused properly or if a foreign object, such as a fine dirt particle, is on the surface of the device then the pit will be obscured and will not be read by the laser. This will then effect the retrievability of information from the information device. Because the laser uses converging light, it has become common practice to cover the surface of the information device with an optically transparent polymeric protective layer to keep dust, and other foreign matter, from the surface of the device. Because the reading laser utilizes converging light, which is wide as it enters the polymeric protective layer, any dust will not adversely affect the reading of the information device since it will be focused past the dust on the protective layer and directly on the pit which is on the information device.

The polymeric protective layer which is on the information storage device must satisfy numerous properties in order for the polymeric layer to properly perform its function. Thus, the polymeric layer must be sufficiently flexible so that if the information device is bent or placed under other dimensional stress, the polymeric layer will not separate from the information device.

Further, the polymeric layer must be optically flat to enable the reading laser beam to retrieve information from the device. Another requirement is that the polymeric layer must be uniform from all angles, i.e., must be non-birefringent. Further, the surface of the polymeric layer must be absolutely smooth. An additional requirement is that the polymeric layer must have a uniform refractive index throughout in order to retrieve the information stored on the device using constant factors at any point.

Yet another requirement for the polymeric coating is that it be substantially free of Benard cell formation. Benard cell formation can occur when a coating composition is polymerized on the surface of a substrate. Certain areas of the coating composition may polymerize faster than other areas of the coating composition. This more rapid polymerization in isolated areas of the coating composition leads to increased surface tension in those areas which are polymerizing more rapidly than other areas. This increased surface tension can lead to a wicking action whereby surrounding areas of the coating composition are attracted to the area which is polymerizing more rapidly. This can result in the build up of micro-thicker barriers which will then lead to thickness irregularities in the polymerized coating. These thicker portions of the polymerized coating will then adversely affect the readability, by the reading laser, of the information stored on the information storage device.

I am not aware of any commercial coating compositions, applied directly to an information storage device, which meet all of the requirements set forth above.

U.S. patent application Ser. No. 329,857 filed Dec. 11, 1981 discloses coating compositions which are esters of beta-acryloxypropionic acid in combination with diacrylates, surfactants and photoinitiators. Nowhere does U.S. Ser. No. 329,857 teach or suggest that the coating compositions are useful for preparing a polymeric coating affixed to an information storage device. Indeed, not all of the materials disclosed in U.S. Ser. No. 329,857 would be suitable for use as a coating composition for an information storage device. Further, U.S. Ser. No. 329,857 discloses coating compositions which one would not want to use to form a polymeric coating on an information storage device. There are only certain combinations of materials, which are not specifically taught as combinations in U.S. Ser. No. 329,857 which may be used to form a polymeric coating on an information storage device wherein the resultant polymeric coating on the device would be strong in meeting all of the requirements set forth above.

The disclosure of U.S. patent application Ser. 329,857 is incorporated by reference herein.

An object of this invention therefor is to provide a coating composition for an information storage device which will be strong in meeting all of the requirements set forth above for the resultant polymeric coated information disc.

Other objects and advantages will become apparent from the following more complete description and claims.

DETAILED DESCRIPTION

Broadly this invention contemplates an information storage device having a polymeric coating thereon, said device comprising a coatable substrate capable of having information encoded on its surface, said polymeric coating having been formed on said surface of said device from the polymerization of a coating composition which comprises a diacrylate and an ester of beta-acryloxypropionic acid, said diacrylate being present in an amount of from about 4% to about 85% by weight of said diacrylate and said ester, said diacrylate being selected from the class consisting of glycol esters of acrylic acid wherein the glycol portion of the ester has the formula $HO-[(CH_2)_mCHR-O]_nH$, wherein R is hydrogen or methyl, m is from 1 to about 2 and n is from one to about 4, and an ester of beta-acryloxypropionic acid selected from the class consisting of the neopentyl glycol ester of di(beta-acryloxypropionic acid) and the esters of glycols having the formula $HO-[(CH_2)_mCHR-O]_nH$, wherein R is hydrogen or methyl, m is from 1 to about 2 and n is from 1 to about 4, said ester of said beta-acryloxypropionic acid being present in an amount of from about 15% to about 95%, based on the weight of the diacrylate and said ester, a surfactant, and, if said coating composition is to be ultra violet or visible light cured, a photoinitiator.

It is surprising to find that when an information storage device, such as a disc, is coated with the defined coating composition of this invention and cured, the resultant coating affixed to the information storage device exhibits excellent properties in all of the areas set forth above. Prior art compositions used for the coating of information storage devices do not exhibit all of the desirable properties.

The coating composition is applied to the surface of an information storage device. The information storage device may be a disc which is made of a metal such as aluminum, a rigid plastic such as polymethyl methacrylate, glass, and the like. The information storage device may be in the shape of a disc, rectangular, or may even be a ribbon of a material such as a polyester film. The information storage device may be of a diameter such as 14 inches or more or may be of a size such as a credit card. The particular dimensions of the information storage device will vary depending upon the amount of information to be encoded thereon and the intended purpose of the storage device.

The coating composition comprises a diacrylate ester and an ester of beta-acryloxypropionic acid. For purposes of simplicity, acryloxypropionic acid will hereinafter be referred to as "AOPA".

The amount of the diacrylate (an ester made from the condensation of acrylic acid with diols) may vary widely. Generally, the diacrylate will be present in an amount of from about 4% to about 85%, based on the weight of the diacrylate and AOPA ester. It is preferred however, that the amount of diacrylate present be from about 10% to about 80%.

The diols used to form the diacrylates have the general formula of $HO-[(CH_2)_mCHR-O]_nH$, wherein R is hydrogen or methyl, m is from 1 to about 2 and n is from 1 to about 4.

Among such diols may be mentioned diethylene glycol, triethylene glycol, tetraethylene glycol, dipropylene glycol, 1, 2 and 3, propane diol, 1, 3 and 1, 4 butane diol, tripropylene glycol, ethoxylated or propoxylated neopentyl glycol, neopentyl glycol, and the like.

The AOPA esters which are used are present in a weight ratio to the diacrylate of from about 15% to about 96% and preferably from about 20% to about 90%.

The diols used in forming the AOPA esters are the same diols which may be used in preparing the diacrylates and, in addition, one may use neopentyl glycol to form the AOPA ester. The manner of preparing the AOPA esters is set forth in pending U.S. patent application Ser. No. 329,857.

The diacrylate and AOPA ester may comprise the entire radiation curable coating composition or they may be present in a total amount of from about 50 to about 100 parts by weight per 100 parts of the entire composition. The remainder of the composition may be other well known monomers and/or oligomers.

A photoinitiator may be present as part of the composition if the composition is to be an ultra violet or visible light cured composition. However, if the composition is to be cured via an electron beam, a photoinitiator is not necessary. If a photoinitiator is to be present, it is generally present in an amount of from about 0.1 to about 12 parts by weight. Among the initiators which may be used are organic peroxides, azo compounds, quinones, benzophenones, benzoin esters, nitroso compounds, acyl halides, aryl halides, hydrazones, mercapto compounds, pyrylium compounds, triarylimidazoles, biimidazoles, chloroalkyltriazines and the like. Such photoinitiators are well known in the art.

A surfactant is present as part of the composition. The surfactant is present in an amount of from about 0.01 to about 1 part by weight. Among the surfactants which may be present are alkylphenol-ethylene oxide condensates such as the Triton ® surfactant series manufactured by Rohm and Haas Company; non-ionic acetylenic glycols such as the Surfynol ® surfactant series obtained from Air Products & Chemical Inc; hydrocarbon-fluorocarbon block oligomers such as the Fluorad ® surfactant series obtained from Minnesota Mining and Manufacturing Co.; and the like.

A flow aid is often present. Although the flow aid is not necessary, such flow aid may be present in amounts of up to about 5 parts by weight. Among the flow aids which may be present are acrylic Modaflow ® and Multiflow ® polymers obtained from Monsanto Corporation, Byk ® 300 series of flow aids obtained from Byk-Mallinckrodt Corporation and the like.

If desired, a stabilizer may be present in an amount of up to about 1 part by weight in order to prevent premature polymerization of the monomer containing coating composition during storage. Among the stabilizers which may be used are hydroquinone and its ethers, phenothiazine, and the like.

If desired, a mold release agent may also be present if the coating composition is to be molded onto the surface of the information storage device.

The viscosity of the coating composition may vary widely. If the coating composition is to be applied and cured at atmospheric pressure, then the viscosity should be from about 3 to about 50 centipoises in order to minimize the possibility of entraping air bubbles into the composition and consequently into the polymeric coating on the information storage device. Additionally, the coating composition must not be so viscous as to adversely affect the spreadability of the coating composition across the surface to be coated.

The viscosity of the coating composition may exceed about 50 centipoises and may even be as high as about 500 centipoises if positive steps are taken to eliminate air bubbles from the coating composition prior to cure. Such a positive step may include coating the information storage device under a reduced atmosphere.

It is preferred, however, that the viscosity of the coating composition be from about 3 to about 5 centipoises because the coating process is simpler.

Coating of the information storage device may be accomplished in any suitable manner such as by brushing, spraying, dipping or molding and the like.

Other monomers may also be present as part of the coating composition as long as the weight ratio of the diacrylate to the AOPA ester is maintained. Whichever additional polymerizable monomer is used, such monomer must be compatible with the entire coating composition and, in particular, compatible with both the diacrylate and the AOPA ester.

In order to more fully illustrate the nature of this invention and the manner of practicing the same, the following examples are presented.

Unless otherwise specified, all parts in the specification and claims are parts by weight per hundred parts of the entire composition.

EXAMPLE 1

The following composition is prepared by simple mixing of the following components:

| Component | Parts by Weight |
| --- | --- |
| Tripropylene glycol diacrylate | 80 |

| Component | Parts by Weight |
| --- | --- |
| bis (beta-acryloxy propionate) of diethylene glycol | 20 |
| 1-hydroxy cyclohexyl phenyl ketone | 3 |
| Fluorad ® FC-430 surfactant | 0.1 |

The composition has a viscosity of about 20 centipoises.

The composition is poured onto a two inch diameter silicon wafer and the wafer is allowed to remain horizontal until the composition flows out across the wafer to form a uniform coating on the wafer of about 150 to 200 microns. The coating composition is then cured on the silicon wafer by exposing the coating composition to a medium pressure mercury lamp (obtained from Fusion Systems Corp.) for a few seconds.

The resultant polymeric coating affixed to the wafer showed substantially no bubbles. The polymer coating, when examined under a Nomarski differential interference contrast microscope at a 40 magnification power, has an even, smooth texture. The polymeric coating is sustantially free of stress and has good flexibility.

EXAMPLE 2

The procedure of Example 1 is repeated except that 100 parts of the same diacrylate is used an no AOPA ester is present. The resultant polymeric coating is hard and heavily stressed.

EXAMPLE 3

The procedure of Example 1 is repeated except that the bis (beta-acryloxy propionate) of diethylene glycol is used in an amount of 100 parts and no diacrylate is added. Because of the manner in which the bis (beta-acryloxypropionate) of diethylene glycol is prepared, as set forth in aforesaid U.S. patent application, Ser. No. 329,857, the composition contains 4% of diethylene glycol diacrylate.

The viscosity of the coating composition is 80 centipoises. No positive steps are taken to prevent the formation of air bubbles in the polymerized coating composition. The resultant polymeric coating affixed to the wafer has some air bubbles entrapped therein. Otherwise, the polymeric coating is smooth, flexible and does not exhibit stress crazing.

EXAMPLE 4

This example is comparative and illustrates polymeric coatings which do not utilize an AOPA ester. The procedure of Example 1 is repeated using the following formulations.

| | Parts by Weight |
| --- | --- |
| Formulation A | |
| Tripropylene glycol diacrylate | 45 |
| Uvithane ® 783 (an acrylated urethane oligomer obtained from Thiokol Corp.) | 55 |
| Benzophenone | 2 |
| 1-hydroxycyclohexyl phenyl ketone | 2 |
| Dimethylamino ethanol (a curing accelerator) | 3 |
| Methyl ether of hydroquinone (MEHQ) | 250 ppm |
| Formulation B | |
| Tripropylene glycol diacrylate | 75 |
| Uvithane ® 783 oligomer | 25 |
| Benzophenone | 2 |
| 1-hydroxycyclohexyl phenyl ketone | 2 |
| Dimethylamino ethanol | 3 |
| MEHQ | 250 ppm |

Formulation A has a viscosity of 1100 centipoises and Formulation B has a viscosity of 90 centipoises. No positive steps are taken to prevent the formation of air bubbles in the polymerized coating composition. Both of these polymerized coatings have an uneven (Benard cells) cellular surface texture. The polymeric coatings are hard and inflexible.

Example 4 is repeated and 0.1 part of Fluorad ® FC-430 surfactant is added to each formulation. The Benard cell problem is alleviated but the polymeric coating affixed to the wafer is still hard and inflexible.

Example 4 is repeated using Byk 500 and Byk 501 flow aids in an amount of 0.1 part for each of Formulations A and B. Again, the Benard cell problem is alleviated but the polymeric coatings are still hard and inflexible rendering such coatings unsuitable for use with an information storage device.

While this invention has been described in terms of certain preferred embodiments and illustrated by means of specific examples, the invention is not to be construed as limited except as set forth in the following claims.

I claim:

1. An information storage device having a polymeric coating thereon, said device comprising a coatable substrate capable of having information encoded on its surface, said polymeric coating having been formed on said surface of said device from the polymerization of a coating composition which comprises a diacrylate and a diester of beta-acryloxypropionic acid, said diacrylate being present in an amount of from about 4% to about 85% by weight of said diacrylate and said diester, said discrylate being selected from the class consisting of glycol esters of acrylic acid wherein the glycol portion of the ester has the formula $HO[(CH_2)_m CHR—O]_n H$, wherein R is hydrogen or methyl, m is from 1 to about 2 and n is from 1 to about 4, neopentyl glycol, ethoxylated neopentyl glycol, and propoxylated neopentyl glycol, and from about 15% to about 96%, based on the weight of said diacrylate and said diester, of said diester of beta-acryloxypropionic acid selected from the class consisting of the neopentyl glycol ester of di(beta-acryloxypropionic acid) and the esters of glycols having the formula $HO[(CH_2)_m CHR—O]_n H$, wherein R is hydrogen or methyl, m is from 1 to about 2 and n is from 1 to about 4, a surfactant, and, if said coating composition is to be ultra violet or visible light cured, a photoinitiator.

2. An information storage device according to claim 1 wherein said diacrylate is present in an amount of from about 10% to about 80%.

3. An information storage device according to claim 1 wherein said diester of said beta-acryloxypropionic acid is present in an amount of from about 20% to about 90%.

4. An information storage device according to claim 1 wherein said diacrylate is diethylene glycol diacrylate.

5. An information storage device according to claim 1 wherein said diacrylate is tetraethylene glycol diacrylate.

6. An information storage device according to claim 1 wherein said diacrylate is 1,4-butane diol diacrylate.

7. An information storage device according to claim 1 wherein said diacrylate is triethylene glycol diacrylate.

8. An information storage device according to claim 1 wherein said diacrylate is tripropylene glycol diacrylate.

9. An information storage device according to claim 1 wherein said diester is the bis (beta-acryloxypropionate) of diethylene glycol.

10. An information storage device according to claim 1 wherein said diester is the neopentyl glycol ester of di(beta-acryloxypropionic acid).

11. An information storage device according to claim 1 wherein said diester is the 1,4-butane ester of beta-acryloxypropionic acid.

12. An information storage device according to claim 1 wherein said diester is the 1,3-propane diol ester of beta-acryloxypropionic acid.

13. An information storage device according to claim 1 wherein said diester is the triethylene glycol ester of beta-acryloxypropionic acid.

14. An information storage device according to claim 1 wherein said coating composition is ultra violet or visible light curable and a photoinitiator is present in an amount of from about 0.1 to about 12 parts by weight.

15. An information storage device according to claim 1 wherein said surfactant is present in an amount of from about 0.01 to about 1 part by weight 16. An information storage device according to claim 1 wherein said diacrylate is tripropylene glycol diacrylate and said diester is the diethylene glycol ester of beta-acryloxypropionic acid.

17. An information storage device according to claim 1 wherein said coating composition has a viscosity of from about 3 to about 50 centipoises.

18. An information storage device according to claim 1 wherein said coating composition has a viscosity of from about 3 to about 500 centipoises.

* * * * *